United States Patent
Nakashio et al.

(10) Patent No.: US 11,955,148 B2
(45) Date of Patent: Apr. 9, 2024

(54) CLEANING TAPE AND CARTRIDGE

(71) Applicant: SONY GROUP CORPORATION, Tokyo (JP)

(72) Inventors: Eiji Nakashio, Tokyo (JP); Takanobu Iwama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,742

(22) PCT Filed: Dec. 25, 2020

(86) PCT No.: PCT/JP2020/048720
§ 371 (c)(1),
(2) Date: Jun. 20, 2022

(87) PCT Pub. No.: WO2021/132561
PCT Pub. Date: Jul. 1, 2021

(65) Prior Publication Data
US 2023/0040136 A1    Feb. 9, 2023

(30) Foreign Application Priority Data
Dec. 27, 2019 (JP) .................. 2019-239476

(51) Int. Cl.
| | |
|---|---|
| *G11B 5/41* | (2006.01) |
| *D04H 1/435* | (2012.01) |
| *D04H 1/4382* | (2012.01) |
| *G11B 23/04* | (2006.01) |
| *G11B 23/107* | (2006.01) |

(52) U.S. Cl.
CPC .............. *G11B 5/41* (2013.01); *D04H 1/435* (2013.01); *D04H 1/43838* (2020.05); *G11B 23/049* (2013.01); *G11B 23/107* (2013.01)

(58) Field of Classification Search
None
See application file for complete search history.

(56) References Cited

U.S. PATENT DOCUMENTS

| | | | |
|---|---|---|---|
| 3,931,643 A * | 1/1976 | Kuroe .................. | G11B 5/41 360/128 |
| 4,722,016 A | 1/1988 | Shirako et al. | |

(Continued)

FOREIGN PATENT DOCUMENTS

| | | |
|---|---|---|
| JP | 67-179935 A | 11/1982 |
| JP | 06-176327 A | 6/1994 |
| JP | 07-019805 U | 4/1995 |

(Continued)

OTHER PUBLICATIONS

International Search Report and Written Opinion of PCT Application No. PCT/JP2020/048720, dated Mar. 16, 2021, 12 pages of ISRWO.

*Primary Examiner* — Craig A. Renner
(74) *Attorney, Agent, or Firm* — CHIP LAW GROUP

(57) ABSTRACT

A cartridge includes a tape-shaped nonwoven fabric, a reel on which the tape-shaped nonwoven fabric is wound, and a case that accommodates the reel. A basis weight of the tape-shaped nonwoven fabric is equal to or less than 25 c/m² and an average fiber diameter of the tape-shaped nonwoven fabric is equal to or less than 11 μm.

15 Claims, 3 Drawing Sheets

(56) References Cited

U.S. PATENT DOCUMENTS

| | | | | |
|---|---|---|---|---|
| 5,317,467 A | * | 5/1994 | Kato et al. | G11B 23/033 360/133 |
| 5,477,406 A | * | 12/1995 | Schaeffer et al. | G11B 23/08771 360/130.33 |

FOREIGN PATENT DOCUMENTS

| | | | | |
|---|---|---|---|---|
| JP | 07-249156 A | | 9/1995 | |
| JP | 07-287823 A | | 10/1995 | |
| JP | 07-296345 A | | 11/1995 | |
| JP | 08-063718 A | | 3/1996 | |
| JP | 11-296826 A | | 10/1999 | |
| JP | 2003193005 A | * | 7/2003 | C09J 7/02 |
| JP | 2006-179058 A | | 7/2006 | |
| JP | 2016-502224 A | | 1/2016 | |
| WO | WO-2007131770 A1 | * | 11/2007 | C09J 7/21 |

\* cited by examiner

CLEANING TAPE AND CARTRIDGE

CROSS REFERENCE TO RELATED APPLICATIONS

This application is a U.S. National Phase of International Patent Application No. PCT/JP2020/048720 filed on Dec. 25, 2020, which claims priority benefit of Japanese Patent Application No. JP 2019-239476 filed in the Japan Patent Office on Dec. 27, 2019. Each of the above-referenced applications is hereby incorporated herein by reference in its entirety.

TECHNICAL FIELD

The present disclosure relates to a cleaning tape and a cartridge.

BACKGROUND ART

Magnetic tape cartridges (for example, LTO Ultrium standard cartridges) have been widely used to store electronic data. In drives for magnetic tape cartridges, cleaning cartridges have been used to clean magnetic heads. In cleaning cartridges for a linear recording format (for example, Universal Cleaning Cartridges (UCC)), magnetic tapes have been used as cleaning tapes (see, for example, PTL 1).

CITATION LIST

Patent Literature

[PTL 1]
JP 2006-179058 A

SUMMARY

Technical Problem

However, a cleaning cartridge using a magnetic tape as a cleaning tape has a problem that a cleaning effect of magnetic heads is low.

In recent years, high-performance magnetic heads such as Giant MagnetoResistive (GMR) heads and Tunnel Magnetoresistive (TMR) heads have been used as magnetic heads for drives in order to increase the recording density (for example, high tracking density) of magnetic tapes. When a deposit of approximately several nm adheres to such a high-performance magnetic head, the recording/reproducing performance of the drive is greatly affected. For this reason, in a drive including a high-performance magnetic head, a reduction in a cleaning cartridge cleaning effect is particularly a problem.

An object of the present disclosure is to provide a cleaning tape having a good cleaning effect, and a cartridge.

Solution to Problem

In order to solve the above-described problem, a first disclosure is a cartridge including and
a tape-shaped nonwoven fabric,
a reel on which the nonwoven fabric is wound,
a case that accommodates the reel,
in which a basis weight of the nonwoven fabric is equal to or less than 25 g/m².
A second disclosure is a cartridge including
a tape-shaped nonwoven fabric, and
a reel on which the nonwoven fabric is wound,
a case that accommodates the reel,
in which an average fiber diameter of the nonwoven fabric is equal to or less than 11 µm.
A third disclosure is a cleaning tape including
a tape-shaped nonwoven fabric,
in which a basis weight of the nonwoven fabric is equal to or less than 25 g/m².
A fourth disclosure is a cleaning tape including
a tape-shaped nonwoven fabric,
in which an average fiber diameter of the nonwoven fabric is equal to or less than 11 µm.

DESCRIPTION OF EMBODIMENTS

An embodiment of the present disclosure will be described in the following order.
1 Configuration of cleaning cartridge
2 Configuration of cleaning tape
3 Effect
4 Modification example

[1 Configuration of Cleaning Cartridge]

Figure 1:
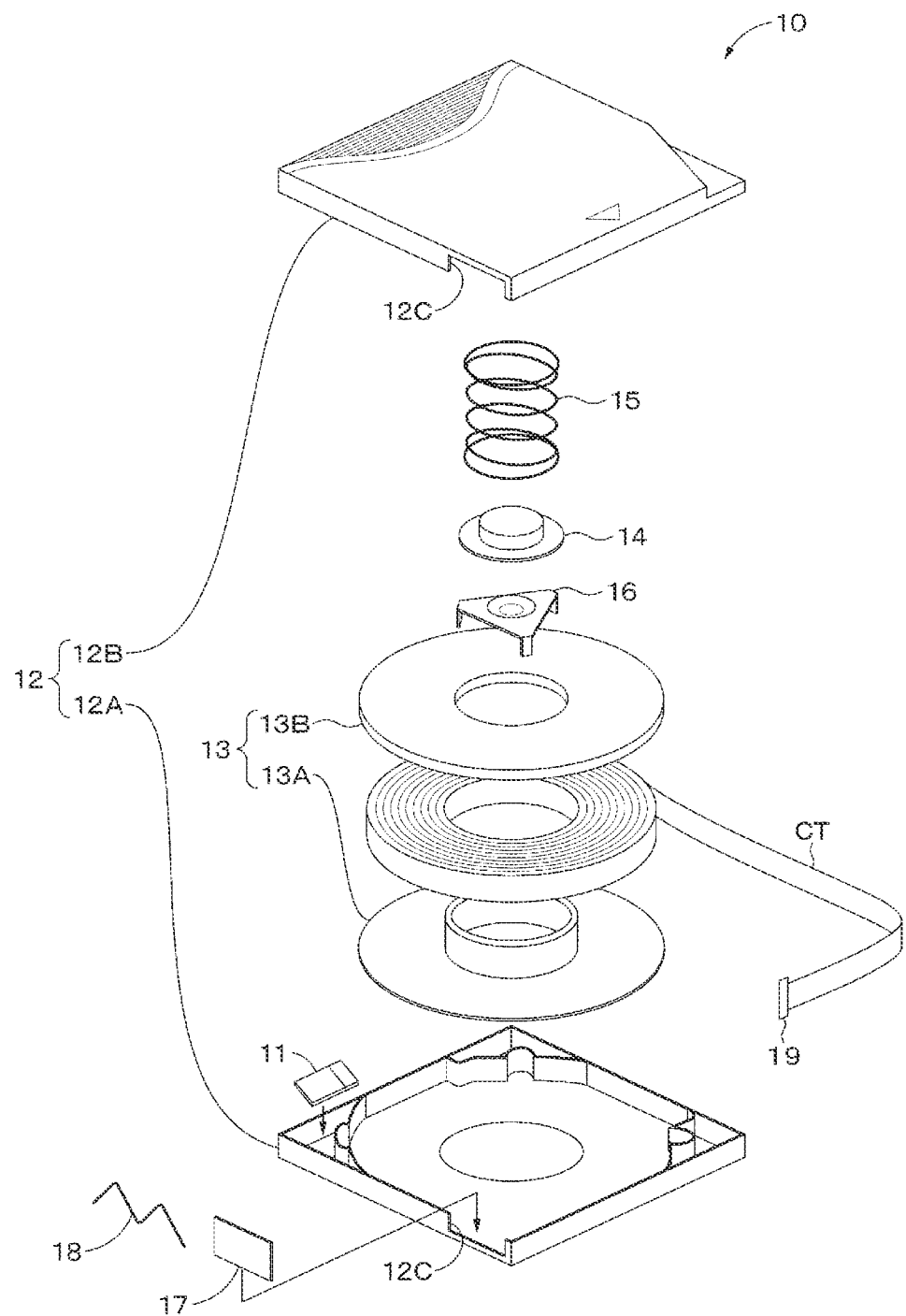
FIG. 1 is an exploded perspective view illustrating an example of a configuration of a cartridge according to an embodiment of the present disclosure.

FIG. 1 is an exploded perspective view illustrating an example of a configuration of a cleaning cartridge (hereinafter, referred to simply as a "cartridge") 10 according to an embodiment of the present disclosure. The cartridge 10 is used in a recording/reproducing device for a linear recording format. Specifically, for example, the cartridge 10 conforms to the Linear Tape-Open (LTO) standard. The cartridge 10 is a 1 reel type.

The cartridge 10 includes a reel 13 on which a cleaning tape CT is wound, a reel lock 14 and a reel spring 15 for locking the rotation of the reel 13, a spider 16 for cancelling a locked state of the reel 13, a slide door 17 that opens and closes a tape draw-out port 12C provided in a cartridge case 12 over a lower shell 12A and a upper shell 12B, a door spring 18 that biases the slide door 17 to a closed position of the tape draw-out port 12C, and a cartridge memory 11 inside the cartridge case 12 constituted by the lower shell 12A and the upper shell 12B. The reel 13 has substantially a disk shape having an opening in the center thereof, and is constituted by a reel hub 13A formed of a hard material such as plastic and a flange 13B. A leader pin 19 is provided at one end of the cleaning tape CT on a winding end side.

A leader tape may be provided at one end of the cleaning tape CT on the winding end side. In this case, one end of the leader tape and one end of the cleaning tape CT may be connected to each other through a splice tape, and the leader pin may be provided at the other end of the leader tape. However, adhesiveness between the cleaning tape CT and the splice tape is low, and thus it is preferable to directly provide the leader pin 19 at one end of the cleaning tape CT.

The cartridge 10 is configured to be loadable into a recording/reproducing device. The cartridge memory 11 is provided in the vicinity of one corner of the cartridge 10. In a state where the cartridge 10 is loaded into the recording/reproducing device, the cartridge memory 11 faces a reader/writer of the recording/reproducing device. The cartridge memory 11 communicates with the recording/reproducing device, specifically, the reader/writer of the recording/reproducing device in accordance with, for example, a wireless communication standard based on an LTO standard. Information making it possible to confirm that a tape wound on the cartridge 10 is the cleaning tape CT, and the like are stored in the cartridge memory 11.

[2 Configuration of Cleaning Tape]

The cleaning tape CT cleans a magnetic head by sliding on the magnetic head provided in the recording/reproducing device. The width of the cleaning tape CT may be ½ inches or may be larger than ½ inches. In a case where the cartridge 10 conforms to the LTO standard, the width of the cleaning tape CT is ½ inches. The cleaning tape CT is formed of tape-shaped nonwoven fabric. In the cartridge 10 in which the cleaning tape CT is formed of a tape-shaped nonwoven fabric, it is possible to improve a cleaning effect as compared with a cartridge in the related art in which a cleaning tape is constituted by a magnetic tape (for example, a UCC).

The nonwoven fabric is formed of, for example, synthetic fibers. The synthetic fibers include, for example, at least one selected from a group consisting of polyester fibers, cellulose fibers, nylon fibers, vinylon fibers, polyethylene fibers, polypropylene fibers, polyolefin fibers, aramid fibers, and rayon fibers. The polyester fibers include, for example, at least one selected from a group consisting of polyethylene terephthalate (PET) fibers, polyethylene naphthalate (PEN) fibers, polytrimethylene terephthalate (PTT fibers), and polybutylene terephthalate (PBT) fibers.

In the present disclosure, a nonwoven fabric conforms to the provisions of JIS L 0222. That is, in the present disclosure, a nonwoven fabric is a fiber sheet, a web, or the like in which fibers are oriented in one direction or randomly, and fibers are coupled by entanglement, and/or fusion, and/or adhesion. However, paper, woven fabrics, knitted fabrics, tufts and squeezed fabrics are excluded.

It is preferable that fibers constituting a nonwoven fabric be oriented in the longitudinal direction of the cleaning tape CT. When the fibers are oriented in the longitudinal direction in this manner, it is thus possible to suppress dust generation from both end faces of the cleaning tape CT in the width direction. It is preferable that a nonwoven fabric do not contain a binder. Because a nonwoven fabric does not contain a binder, it is possible to suppress adhesion of a binder to the surface of the magnetic head at the time of making the magnetic head slide on the cleaning tape CT. In the present specification, the magnetic head means a recording head and a reproduction head.

Whether a nonwoven fabric contains a binder is confirmed as follows. First, the cleaning tape CT is unwound from the cartridge 10 and is cut to obtain a measurement sample having a length of 100 mm and a width of the cleaning tape CT (for example, ½ inches). Next, by extracting a binder from the measurement sample using methyl ethyl ketone as a solvent and analyzing it using liquid chromatography, it is checked whether a nonwoven fabric contains a binder.

(Basis weight of nonwoven fabric)

An upper limit value of a basis weight of a nonwoven fabric is preferably equal to or less than 25 $g/m^2$. When the basis weight of the nonwoven fabric is equal to or less than 25 $g/m^2$, the nonwoven fabric can have a sufficient amount of gaps, and thus a cleaning effect can be improved. In addition, because the nonwoven fabric has a sufficient amount of gaps, it is possible to prevent the nonwoven fabric from becoming hard. Thus, it is possible to prevent the magnetic head from being damaged due to cleaning.

A lower limit value of a basis weight of a nonwoven fabric is preferably equal to or greater than 10 $g/m^2$. When the basis weight of the nonwoven fabric is equal to or greater than 10 $g/m^2$, it is possible to prevent the amount of fibers constituting the nonwoven fabric from being reduced, and thus it is possible to prevent the tensile strength of the nonwoven fabric from being decreased.

The basis weight of the nonwoven fabric is obtained as follows. First, the cleaning tape CT is unwound from the cartridge 10 and is cut to obtain a measurement sample having a length of 100 mm and a width of the cleaning tape CT (for example, ½ inches). Next, after the mass M of the measurement sample is measured, the basis weight of the nonwoven fabric is obtained from the following expression.

The basis weight[$mg/cm^2$] of the nonwoven fabric= (mass$M$ of measurement sample)/(area$S$ of measurement sample)

(Average Fiber Diameter of Nonwoven Fabric)

An upper limit value of an average fiber diameter of a nonwoven fabric is preferably equal to or less than 11 µm. When the average fiber diameter of the nonwoven fabric is equal to or less than 11 µm, the nonwoven fabric can have a sufficient amount of gap, and thus a cleaning effect can be improved. In addition, because the nonwoven fabric has a sufficient amount of gap, it is possible to prevent the nonwoven fabric from becoming hard. Thus, it is possible to prevent the magnetic head from being damaged due to cleaning.

A lower limit value of the average fiber diameter of the nonwoven fabric is preferably equal to or greater than 9 µm. When the average fiber diameter of the nonwoven fabric is equal to or greater than 9 µm, it is possible to prevent fibers constituting the nonwoven fabric from becoming too thin, and thus it is possible to prevent the tensile strength of the nonwoven fabric from being decreased.

The average fiber diameter of the nonwoven fabric is obtained as follows. First, the cleaning tape CT to be measured is unwound and cut to manufacture a measurement sample. Next, the surface of the measurement sample is observed by a Scanning Electron Microscope (SEM) under the following conditions to obtain an SEM image.

Device: manufactured by Hitachi High-Technologies Corporation, S-4800 Acceleration voltage: 5 kV Magnification: 2500 times Next, 50 fibers each which has parallel portions substantially parallel to an observation surface and of each of which a fiber diameter can be clearly checked are selected from the obtained SEM image. In addition, the fiber diameter of each of the selected 50 fibers is measured. The measurement position of the fiber diameter is randomly selected from among the parallel portions in the selected fibers. Next, the measured fiber diameter is simply averaged (arithmetic mean) to obtain an average fiber diameter.

(Average Thickness of Nonwoven Fabric)

An upper limit value of an average thickness of a nonwoven fabric is preferably equal to or less than 100 µm, and more preferably equal to or less than 70 µm. When the thickness of the nonwoven fabric is equal to or less than 100

μm, contact between the cleaning tape CT and a head block is suitably maintained, and a stable cleaning effect can be exhibited.

A lower limit value of an average thickness of a nonwoven fabric is preferably equal to or greater than 40 μm. When the average thickness of the nonwoven fabric is equal to or greater than 40 μm, it is possible to prevent the tensile strength of the nonwoven fabric from being decreased.

The average thickness of the nonwoven fabric is obtained as follows. First, the cleaning tape CT is unwound from the cartridge 10, and the thickness of a nonwoven fabric is measured at five or more positions in the longitudinal direction. Next, the average thickness of the nonwoven fabric is calculated by simply averaging the measured values (arithmetic mean). A thickness is measured on the basis of a method A described in JIS L 1913:2010. A measurement position is randomly selected from among the positions of the cleaning tape CT in the longitudinal direction.

(Dynamic friction coefficient μ of nonwoven fabric)

A dynamic friction coefficient μ of a nonwoven fabric is preferably equal to or less than 0.04, and more preferably equal to or less than 0.03. When the dynamic friction coefficient μ of the nonwoven fabric is equal to or less than 0.04, it is possible to prevent the magnetic head from being damaged due to cleaning. Here, the dynamic friction coefficient μ of the nonwoven fabric means a dynamic friction coefficient on a cleaning surface on which the magnetic head slides.

Figure 2A:
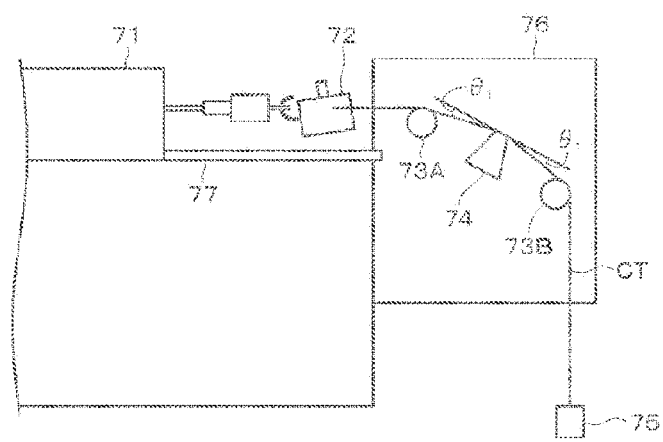
FIGS. 2A and 2B are schematic diagrams illustrating a method of measuring a dynamic friction coefficient between a cleaning tape and a magnetic head.

The dynamic friction coefficient μ is obtained as follows. First, the cleaning tape CT is unwound from the cartridge 10 and is cut into a length of 30 cm. Next, as illustrated in FIG. 2A, the cut cleaning tape CT is placed such that the cleaning surface comes into contact with two columnar guide rolls 73A and 73B arranged parallel to and separated from each other and each having a diameter of 1 inch. The two guide rolls 73A and 73B are fixed to a hard plate-shaped member 76, and thus a positional relationship therebetween is fixed.

Subsequently, the cleaning tape CT is brought into contact with a head block (for recording and reproducing) 74 mounted on a LTO5 drive so that the cleaning surface comes into contact therewith and a wrap angle θ1(° is set to 5.6 degrees. The head block 74 is disposed in substantially the center between the guide rolls 73A and 73B. Although the head block 74 is movably attached to the plate-shaped member 76 so as to be able to change the wrap angle θ1, the position thereof is fixed to the plate-shaped member 76 when the wrap angle θ1)(° is set to 5.6 degrees, and thus a positional relationship between the guide rolls 73A and 73B and the head block 74 is also fixed.

Figure 2B:
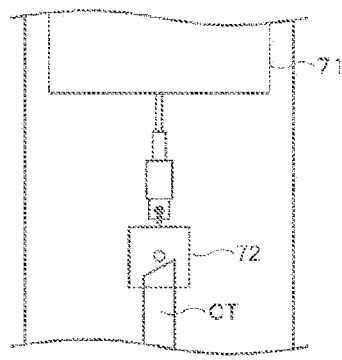

One end of the cleaning tape CT is connected to a movable strain gauge 71 through a jig 72. The cleaning tape CT is fixed to the jig 72 as illustrated in FIG. 2B. A weight 75 is connected to the other end of the cleaning tape CT. A tension ($T_0[N]$) of 0.6 N is applied in the longitudinal direction of the cleaning tape CT by the weight 75. The movable strain gauge 71 is fixed onto a stand 77. A positional relationship between the stand 77 and the plate-shaped member 76 is also fixed, and thus a positional relationship between the guide rolls 73A and 73B, the head block 74, and the movable strain gauge 71 is fixed.

The cleaning tape CT is caused to slide on the head block 74 by 60 mm (outward route) and to slide by 60 mm to be away from the movable strain gauge 71 (return route) so that the cleaning tape CT is directed to the movable strain gauge 71 at 10 mm/s by the movable strain gauge 71. An output value (voltage) of the movable strain gauge 71 at the time of sliding is converted into a load T [N] on the basis of a linear relationship between an output value and a load which have been acquired in advance (which will be described later). A Tave [N] is obtained by acquiring 13 T [N] from the start of the above-described sliding of 60 mm to the stopping of the sliding and performing simple averaging on 11 T [N] obtained by subtracting a total of two T [N], that is, the first load and the last load. Thereafter, a dynamic friction coefficient μ is obtained from the following expression.

$$\mu = \frac{1}{(\theta_1[°]) \times (\pi/180)} \times \ln\left(\frac{T_{aVe}[N]}{T_0[N]}\right) \quad [\text{Math. 1}]$$

The linear relationship is obtained as follows. That is, an output value (voltage) of the movable strain gauge 71 is obtained for each of a case where a load of 0.5 N is applied to the movable strain gauge 71 and a case where a load of 1.0 N is applied. A linear relationship between an output value and a load is obtained from the obtained two output values and the two loads. As described above, an output value (voltage) of the movable strain gauge 71 at the time of sliding is converted into T[N] using the linear relationship.

(Degrees of load area ratios 0%, 50%, and 100% of nonwoven fabric)

The degree of a load area ratio 0% of a nonwoven fabric is preferably equal to or greater than −10 μm. When the degree of the load area ratio 0% of the nonwoven fabric is equal to or greater than −10 μm, fibers constituting the nonwoven fabric are densely collected, and thus it is possible to make it difficult for the collected deposits to fall off again.

The degree of a load area ratio 50% of a nonwoven fabric is preferably less than ±2 μm. When the degree of the load area ratio 50% of the nonwoven fabric is less than ±2 μm, a close contact with the magnetic head can be achieved.

The degree of a load area ratio 100% of a nonwoven fabric is preferably equal to or less than 10 μm. When the degree of the load area ratio 100% of the nonwoven fabric is equal to or less than 10 μm, a contact with the magnetic head can be maintained.

The degrees of the load area ratios 0%, 50%, and 100% of the nonwoven fabric are obtained as follows. A load curve is obtained from a shape measured at an objective lens magnification of 20 times by using a non-contact type optical roughness measuring machine VertScan by an analyzer, and the degrees in the cases of the load area ratios 0%, 50%, and 100% are obtained.

(Tensile strength of nonwoven fabric)

A lower limit value of a tensile strength of a nonwoven fabric is preferably equal to or greater than 15 N/50 mm, and more preferably equal to or greater than 19 N/50 mm. When the strength of a nonwoven fabric is 15 N/50 mm, it is possible to sufficiently withstand a tension applied at the time of cleaning the magnetic head.

An upper limit value of a tensile strength of a nonwoven fabric is preferably equal to or less than 30 N/50 mm from the viewpoint of suppressing an increase in the thickness of a nonwoven fabric.

The tensile strength of the nonwoven fabric is obtained as follows. First, the cleaning tape CT is unwound from the cartridge 10 and is cut to prepare 10 measurement samples each having a length of 70 mm and a width of the cleaning tape CT (for example, ½ inches). These measurement samples are taken out every 10 m in the longitudinal direction. Next, after both ends of the measurement sample in the longitudinal direction are grasped by a tensile strength tester (manufactured by Shimadzu Corporation, AG-IS 100N) so that a measurement length (the length of an ungrasped portion of the measurement sample) is 50 mm, a maximum load value (N) until the measurement sample breaks due to pulling of the measurement sample in the longitudinal direction at a speed of 300 mm/min is measured. This measurement is performed on 10 measurement samples, the measured maximum load values (N) are simply averaged (arithmetic mean) to calculate an average value, and this average value is set to be a tensile strength of the nonwoven fabric.

[3 Effects]

As described above, in the cartridge 10 according to the embodiment, when a basis weight of a tape-shaped nonwoven fabric constituting the cleaning tape CT is equal to or less than 25 g/m$^2$, it is possible to obtain a good cleaning effect while suppressing damage to the magnetic head due to cleaning.

When an average fiber diameter of the tape-shaped nonwoven fabric constituting the cleaning tape CT is equal to or less than 11 μm, it is possible to obtain a good cleaning effect while suppressing damage to the magnetic head due to cleaning.

4 Modification Example

Modification Example 1

In the above-described embodiment, a case where the cartridge 10 includes the cleaning tape CT has been described, but a magnetic tape cartridge may include the cleaning tape CT. In this case, the cleaning tape CT may be provided at at least one of one end of the magnetic tape on a winding end side and one end on a side where the winding is started.

Modification Example 2

In the above-described embodiment, a case where a cleaning cartridge is the 1-reel type cartridge 10 has been described, but the cleaning cartridge may be a 2-reel type cartridge.

Figure 3:
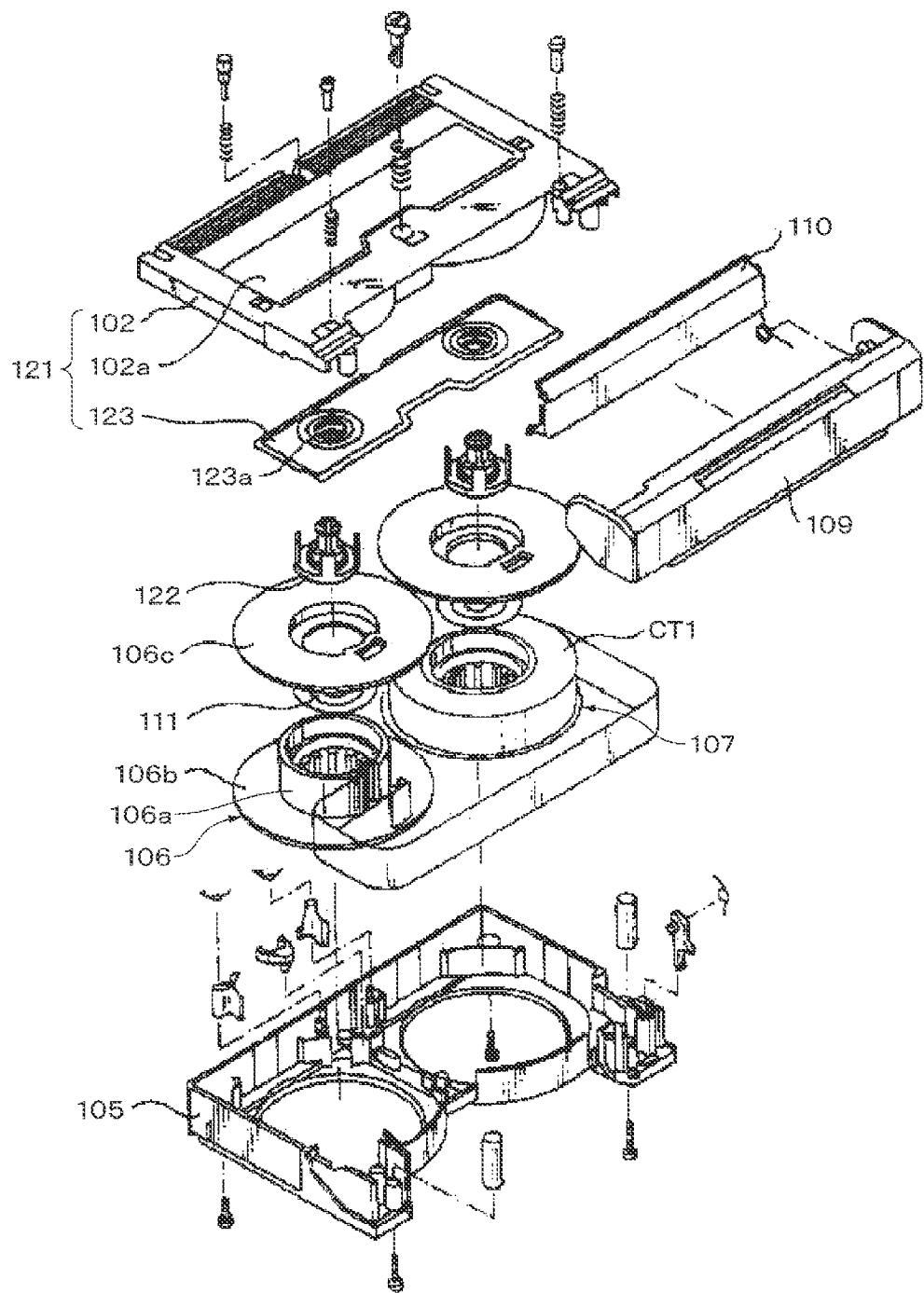
FIG. 3 is an exploded perspective view illustrating an example of a configuration of a cartridge according to a modification example of the embodiment of the present disclosure.

FIG. 3 is an exploded perspective view illustrating an example of a configuration of a 2-reel type cartridge 121. The cartridge 121 includes an upper half 102 formed of synthetic resin, a transparent window member 123 which is fitted to a window portion 102a opening on an upper surface of the upper half 102 and firmly fixed, a reel holder 122 which is firmly fixed to the inside of the upper half 102 and prevents reels 106 and 107 from rising, a lower half 105 that corresponds to the upper half 102, the reels 106 and 107 that are accommodated in a space formed by combining the upper half 102 and the lower half 105, a cleaning tape CT1 which is wound on the reels 106 and 107, a front lid 109 that closes a front-side opening portion formed by combining the upper half 102 and the lower half 105, and a back lid 110 that protects the cleaning tape CT1 exposed to the front-side opening portion.

The reel 106 includes a lower flange 106b that has a cylindrical hub portion 106a having the cleaning tape CT1 wound thereon in the central portion thereof, an upper flange 106c that has substantially the same size as the lower flange 106b, and a reel plate 111 which is sandwiched between the hub portion 106a and the upper flange 106c. The reel 107 has the same configuration as that of the reel 106.

The window member 123 is provided with mounting holes 123a for assembling the reel holder 122, which is a reel holding means for preventing the reels 106 and 107 from rising, at positions corresponding to the reels 106 and 107. The cleaning tape CT1 is the same as the cleaning tape CT in the first embodiment.

In the above-described example, a case where the 2-reel type cartridge 121 includes the cleaning tape CT1 has been described, but a 2-reel type magnetic tape cartridge may include the cleaning tape CT1. In this case, the cleaning tape CT1 may be provided at at least one of one end of the magnetic tape on a winding end side and one end on a side where the winding is started.

EXAMPLES

Hereinafter, the present disclosure will be specifically described with reference to examples, but the present disclosure is not limited to these examples.

In the following Examples 1 and 2 and Comparative examples 1 to 4, an average thickness, a basis weight, an average fiber diameter, the degrees of load area ratios 0%, 50%, and 100%, a tensile strength, and a dynamic friction coefficient of a cleaning tape are obtained by the measurement method described in the above-described embodiment.

Examples 1 and 2, Comparative Example 1

First, a nonwoven fabric having specifications shown in Table 1 was prepared as a cleaning tape. Next, the cleaning tape was produced by cutting the nonwoven fabric into a tape shape having a width of ½ inches. Next, a cartridge case conforming to the LTO standard, which has the configuration illustrated in FIG. 1, was prepared, one end of the cleaning tape was attached to a reel of the cartridge case, the cleaning tape was wound up into a length of 30 m, and then a leader pin was attached to the other end on a winding end side. Thereby, an objective cartridge was obtained.

Comparative Example 2

A cartridge was obtained in the same manner as in Example 1 except that a tape-shaped woven fabric, having the specifications shown in Table 1, in which PET fibers were woven in a lattice pattern was used as a cleaning tape.

Comparative Example 3

A cartridge was obtained in the same manner as in Example 1 except that a tape-shaped knit, having the specifications shown in Table 1, in which PET fibers were knitted was used as a cleaning tape.

Comparative Example 4

A cartridge (that is, a UCC in the related art) was obtained in the same manner as in Example 1 except that a magnetic tape having the specifications shown in Table 1 was used as a cleaning tape and the magnetic tape was wound around the cartridge by 319 m.

[Evaluation]

The cartridges obtained as described above and the cleaning tape used for the cartridges were evaluated as follows.

(Generation of End Face Dust)

The generation of end face dust in the cleaning tape was evaluated as follows. First, the cartridge was loaded into a drive, and then the cleaning tape was reciprocated 10 times to perform cleaning processing. Next, the edge (cut surface) of the cleaning tape was observed with an optical microscope in a range of 30 mm in length, and it was confirmed whether end face dust was generated.

(The Number of Times of Use)

The number of times of use of the cleaning tape was evaluated as follows. First, the magnetic tape cartridge was loaded into the drive, the magnetic tape was run, powder was dropped from the magnetic tape onto the magnetic head, deposits were adhered to the head, and then the magnetic tape cartridge was unloaded from the drive. Next, the cleaning tape cartridge was loaded into the drive, the cleaning tape was reciprocated once to perform cleaning processing on the magnetic head, and then the cleaning tape cartridge was unloaded from the drive. Next, the magnetic head was observed by an optical microscope, and it was confirmed whether deposits were removed.

The number of times of use of the cleaning tape cartridge capable of removing deposits was counted by repeating the above-described procedure.

(Cleaning Effect)

A cartridge cleaning effect was evaluated as follows. First, data was recorded on the entire surface of the magnetic tape of an LTO8-standard cartridge by an LTO8-standard drive. Next, a recording head after data recording was observed by the optical microscope, and it was confirmed that there was a deposit adhering to the recording head. Next, the cleaning cartridge was loaded into the drive, a head unit was cleaned using a cleaning tape according to a cleaning procedure, and the recording head was cleaned. Next, the recording head after the cleaning was observed by the optical microscope. Next, a cleaning effect was evaluated in accordance with the following criteria:

Good cleaning effect: No deposits are observed
Poor cleaning effect: Deposits are observed (Head Damage)

Damage of the magnetic head at the time of using a cartridge was evaluated as follows. First, an LTO8-standard drive for which a reproduction output before running was confirmed in advance was prepared, the cleaning tape was run 10 times, and a reproduction output was confirmed again. Next, it was evaluated whether head damage occurred according to the following criteria.

No head damage: No deterioration of 3 dB or more is observed in a reproduction output after running is performed 10 times.

Occurrence of head damage: Deterioration of 3 dB or more is observed in a reproduction output after running is performed 10 times.

Table 1 shows specifications of a cleaning tape and evaluation results.

TABLE 1

| | | | | | Average | Degree of | Degree of | Degree of |
| | | | Average | Basic | fabric | load area | load area | load area |
| | Tape | Fabic | thickness | weight | diameter | ratio 0% | ratio 50% | ratio 100% |
| | type | material | [μm] | [g/m²] | [μm] | [μm] | [μm] | [μm] |
| --- | --- | --- | --- | --- | --- | --- | --- | --- |
| Example 1 | Nonwoven fabric | PET | 70 | 25 | 9 | −10 | 2 | 8 |
| Example 2 | Nonwoven fabric | PET | 70 | 24 | 11 | −9 | −2 | 9 |
| Comparative example 1 | Nonwoven fabric | PET | 110 | 30 | 13 | −12 | −3 | 12 |
| Comparative example 2 | Woven fabric (lattice shape) | PET | 130 | 35 | 15 | −12 | 4 | 10 |
| Comparative example 3 | Knit | PET | 130 | 40 | 20 | −12 | −4 | 10 |
| Comparative example 4 | Magnetic tape | — | — | 9 | — | — | — | — |

| | | Cleaning tape specifications | | | Evaluation result | | |
| | | Tensile | Dynamic | Winding | Generation | Number of times | | |
| | Tape | strength | friction | length | of end | of use | Cleaning | Head |
| | type | [N/50 mm] | coefficient | [m] | face dust | [times] | effect | damage |
| --- | --- | --- | --- | --- | --- | --- | --- | --- |
| Example 1 | Nonwoven fabric | 19 | 0.03 | 30 | No | 10 | Good | No |
| Example 2 | Nonwoven fabric | 19 | 0.03 | 30 | No | 10 | Good | No |
| Comparative example 1 | Nonwoven fabric | 40 | 0.06 | 30 | Yes | 3 | Poor | Yes |
| Comparative example 2 | Woven fabric (lattice shape) | Unmeasurable | 0.05 | 30 | No | 3 | Poor | Yes |
| Comparative example 3 | Knit | Unmeasurable | 0.05 | 30 | No | 3 | Poor | Yes |
| Comparative example 4 | Magnetic tape | — | — | 319 | — | — | Poor | — |

In the column of a tensile strength in Table 1, "unmeasurable" means that a measurement sample did not break within the range of a measured load of a tensile strength test. In addition, "winding length" means the length of the cleaning tape wound on the cartridge.

In Table 1, evaluation results of cleaning effects in Comparative examples 1 to 4 are uniformly described as "bad", but among Comparative examples 1 to 4, the evaluation result of the cleaning effect in Comparative example 4 in which a magnetic tape was used as the cleaning tape was particularly poor.

The Following can be Seen from Table 1.

By using a tape-shaped nonwoven fabric having a basis weight of 25 g/m² or less as the cleaning tape, a good cleaning effect can be obtained while suppressing head damage. In addition, it is possible to suppress end face dust and increase the number of times the cartridge is used.

By using a tape-shaped nonwoven fabric having an average fiber diameter of 11 μm or less as the cleaning tape, a good cleaning effect can be obtained while suppressing head damage. In addition, it is possible to suppress end face dust and increase the number of times the cartridge is used.

Although embodiments of the present disclosure have been described above in detail, the present disclosure is not limited to the above-described embodiments and various modifications based on the technical spirit of the present disclosure can be made.

The configurations, methods, processes, shapes, materials, numerical values, and the like provided in the embodiments described above are merely examples, and different configurations, methods, processes, shapes, materials, numerical values, and the like may be used as necessary.

The configurations, methods, steps, shapes, materials, numerical values, and the like of the above-described embodiments can be combined with each other without departing from the gist of the present technique.

In the numerical ranges described in a stepwise manner in the above-described embodiment, an upper limit value or a lower limit value of a numerical range in any step may be replaced with an upper limit value or a lower limit value of a numerical range in another step.

Unless otherwise specified, the materials exemplified in the above-described embodiments and modification examples can be used alone or in combination of two or more.

Further, the present disclosure can also adopt the following configurations.

(1) A cartridge including:
a tape-shaped nonwoven fabric;
a reel on which the nonwoven fabric is wound; and
a case that accommodates the reel,
wherein a basis weight of the nonwoven fabric is equal to or less than 25 g/m².

(2) The cartridge according to (1),
wherein an average fiber diameter of the nonwoven fabric is equal to or less than 11 μm.

(3) The cartridge according to (1) or (2),
wherein an average fiber diameter of the nonwoven fabric is equal to or greater than 9 μm and equal to or less than 11 μm.

(4) The cartridge according to any one of (1) to (3),
wherein the nonwoven fabric does not contain a binder.

(5) The cartridge according to any one of (1) to (4),
wherein an average thickness of the nonwoven fabric is equal to or less than 100 μm.

(6) The cartridge according to any one of (1) to (5),
wherein a dynamic friction coefficient of the nonwoven fabric is equal to or less than 0.04.

(7) The cartridge according to any one of (1) to (6),
wherein a degree of a load area ratio 0% of the nonwoven fabric is equal to or greater than −10 μm,
a degree of a load area ratio 50% of the nonwoven fabric is less than ±2 μm, and
a degree of a load area ratio 100% of the nonwoven fabric is equal to or less than 10 μm.

(8) The cartridge according to any one of (1) to (7),
wherein a tensile strength of the nonwoven fabric is equal to or greater than 15 N/50 mm.

(9) The cartridge according to any one of (1) to (8),
wherein the nonwoven fabric is formed of a polyester fiber.

(10) The cartridge according to any one of (1) to (9),
wherein the cartridge is used in a recording/reproducing device for a linear recording format.

(11) The cartridge according to any one of (1) to (10),
wherein a width of the nonwoven fabric is ½ inches.

(12) The cartridge according to any one of (1) to (11),
wherein the cartridge is a 1-reel type.

(13) The cartridge according to any one of (1) to (12), further including:
a leader pin which is provided at one end of the nonwoven fabric on a winding end side.

(14) A cartridge including:
a tape-shaped nonwoven fabric;
a reel on which the nonwoven fabric is wound; and
a case that accommodates the reel,
wherein an average fiber diameter of the nonwoven fabric is equal to or less than 11 μm.

(15) The cartridge according to (14),
wherein an average fiber diameter of the nonwoven fabric is equal to or greater
than 9 μm and equal to or less than 11 μm.

(16) A cleaning tape including:
a tape-shaped nonwoven fabric,
wherein a basis weight of the nonwoven fabric is equal to or less than 25 g/m².

(17) A cleaning tape including:
a tape-shaped nonwoven fabric,
wherein an average fiber diameter of the nonwoven fabric is equal to or less than 11 μm.

REFERENCE SIGNS LIST 10, 121 Cleaning cartridge
11 Cartridge memory
12 Cartridge case
13 Reel
19 Leader pin
CT, CT1 Cleaning tape

The invention claimed is:
1. A cartridge, comprising:
a tape-shaped nonwoven fabric;
a reel on which the tape-shaped nonwoven fabric is wound; and
a case configured to accommodate the reel, wherein
a basis weight of the tape-shaped nonwoven fabric is equal to or less than 25 g/m², and
the tape-shaped nonwoven fabric includes a plurality of fibers oriented in a longitudinal direction of the tape-shaped nonwoven fabric.

2. The cartridge according to claim 1, wherein an average fiber diameter of the tape-shaped nonwoven fabric is equal to or less than 11 μm.

3. The cartridge according to claim 1, wherein an average fiber diameter of the tape-shaped nonwoven fabric is equal to or greater than 9 μm and equal to or less than 11 μm.

4. The cartridge according to claim 1, wherein the tape-shaped nonwoven fabric does not contain a binder.

5. The cartridge according to claim 1, wherein an average thickness of the tape-shaped nonwoven fabric is equal to or less than 100 μm.

6. The cartridge according to claim 1, wherein a dynamic friction coefficient of the tape-shaped nonwoven fabric is equal to or less than 0.04.

7. The cartridge according to claim 1, wherein
a degree of a load area ratio 0% of the tape-shaped nonwoven fabric is equal to or greater than −10 μm,
a degree of a load area ratio 50% of the nonwoven tape-shaped nonwoven fabric is less than ±2 μm, and
a degree of a load area ratio 100% of the nonwoven tape-shaped nonwoven fabric is equal to or less than 10 μm.

8. The cartridge according to claim 1, wherein a tensile strength of the tape-shaped nonwoven fabric is equal to or greater than 15 N/50 mm.

9. The cartridge according to claim 1, wherein the tape-shaped nonwoven fabric is formed of a polyester fiber.

10. The cartridge according to claim 1, wherein the cartridge is used in a recording/reproducing device for a linear recording format.

11. The cartridge according to claim 1, wherein a width of the tape-shaped nonwoven fabric is ½ inches.

12. The cartridge according to claim 1, wherein the cartridge is a 1-reel type.

13. The cartridge according to claim 1, further comprising:
 a leader pin which is provided at one end of the tape-shaped nonwoven fabric on a winding end side.

14. A cartridge, comprising:
 a tape-shaped nonwoven fabric;
 a reel on which the tape-shaped nonwoven fabric is wound; and
 a case configured to accommodate the reel, wherein
  an average fiber diameter of the tape-shaped nonwoven fabric is equal to or less than 11 μm, and
  the tape-shaped nonwoven fabric includes a plurality of fibers oriented in a longitudinal direction of the tape-shaped nonwoven fabric.

15. The cartridge according to claim 14, wherein an average fiber diameter of the tape-shaped nonwoven fabric is equal to or greater than 9 μm and equal to or less than 11 μm.

* * * * *